US011028553B2

(12) United States Patent
Hashimoto et al.

(10) Patent No.: US 11,028,553 B2
(45) Date of Patent: Jun. 8, 2021

(54) CONSTRUCTION MACHINE

(71) Applicants: Kobe Steel, Ltd., Kobe (JP); KOBELCO CONSTRUCTION MACHINERY CO., LTD., Hiroshima (JP)

(72) Inventors: Hiroshi Hashimoto, Kobe (JP); Takashi Hiekata, Kobe (JP)

(73) Assignees: Kobe Steel, Ltd., Kobe (JP); KOBELCO CONSTRUCTION MACHINERY CO., LTD., Hiroshima (JP)

( * ) Notice: Subject to any disclaimer, the term of this patent is extended or adjusted under 35 U.S.C. 154(b) by 323 days.

(21) Appl. No.: 16/320,339

(22) PCT Filed: Jul. 12, 2017

(86) PCT No.: PCT/JP2017/025366
§ 371 (c)(1),
(2) Date: Jan. 24, 2019

(87) PCT Pub. No.: WO2018/034086
PCT Pub. Date: Feb. 22, 2018

(65) Prior Publication Data

US 2019/0277004 A1 Sep. 12, 2019

(30) Foreign Application Priority Data

Aug. 18, 2016 (JP) ............................ JP2016-160615

(51) Int. Cl.
*E02F 3/43* (2006.01)
*E02F 9/20* (2006.01)
(Continued)

(52) U.S. Cl.
CPC .............. *E02F 3/43* (2013.01); *E02F 9/2033* (2013.01); *E02F 9/24* (2013.01); *E02F 9/267* (2013.01); *G01B 11/00* (2013.01)

(58) Field of Classification Search
CPC ... E02F 3/43; E02F 9/2033; E02F 9/24; E02F 9/267; G01B 11/00
See application file for complete search history.

(56) References Cited

U.S. PATENT DOCUMENTS 4,937,441 A 6/1990 Ishizawa et al.
2009/0066968 A1 3/2009 Ikeda et al.
(Continued)

FOREIGN PATENT DOCUMENTS

CN 105493503 A 4/2016
CN 105518221 A 4/2016
(Continued)

OTHER PUBLICATIONS

Extended European Search Report dated Jun. 13, 2019 in Patent Application No. EP 17841314.2 (6 pages).
(Continued)

*Primary Examiner* — Ramsey Refai
(74) *Attorney, Agent, or Firm* — Oblon, McClelland, Maier & Neustadt, L.L.P.

(57) ABSTRACT

A construction machine includes a boom, an operator cab, a distance sensor, a displacement detection unit, a storage unit, and a position information acquisition unit. The distance sensor has a predetermined field of view and acquires distance image data indicating a distance distribution of an environment around the operator cab. The storage unit stores initial position information of the boom. The displacement detection unit compares comparative position information of the boom, the comparative position information being acquired from the distance image data by the position
(Continued)

information acquisition unit, with initial position information of the boom stored in the storage unit to detect a displacement of the distance sensor with respect to the operator cab when the boom is brought into an initial posture again after initial setting.

11 Claims, 10 Drawing Sheets

(51) Int. Cl.

| | |
|---|---|
| ***E02F 9/24*** | (2006.01) |
| ***E02F 9/26*** | (2006.01) |
| ***G01B 11/00*** | (2006.01) |

(56) References Cited

U.S. PATENT DOCUMENTS

2012/0327261 A1* 12/2012 Tafazoli Bilandi ..... E02F 9/262 348/222.1

2015/0326829 A1* 11/2015 Kurihara ............... G01S 13/931 348/148

FOREIGN PATENT DOCUMENTS

| | | | |
|---|---|---|---|
| JP | 58-118903 | A | 7/1983 |
| JP | 61-33092 | A | 2/1986 |
| JP | 1-116410 | A | 5/1989 |
| JP | 6-8461 | U | 2/1994 |
| JP | 8-74295 | A | 3/1996 |
| JP | 2001-64992 | A | 3/2001 |
| JP | 2008-74295 | A | 4/2008 |
| JP | 2012-225111 | A | 11/2012 |
| JP | 2014-215039 | A | 11/2014 |
| JP | 2016-223963 | A | 12/2016 |

OTHER PUBLICATIONS

International Search Report dated Oct. 3, 2017, in PCT/JP2017/025366, filed Jul. 12, 2017.

* cited by examiner

CONSTRUCTION MACHINE

TECHNICAL FIELD

The present invention relates to a construction machine provided with a detection unit.

BACKGROUND ART

In a construction machine, an attachment other than an attachment intended by a manufacturer of the construction machine may be attached by a user. Further, in a construction machine such as a demolition machine, a member of a demolished building may be held by an attachment. In these cases, there is an increased possibility that the attachment or the member of the demolished building interferes with an operator cab as an interfering object. Accordingly, it is necessary to prevent the interference. Thus, a sensor is attached to the body of the construction machine to detect a distance between the operator cab and the interfering object to prevent the interference of the interfering object with the operator cab.

Patent Literature 1 discloses an interference prevention device which determines whether a bucket has entered an interference dangerous area set in front of an operator cab using a plurality of ultrasonic sensors. Patent Literature 2 discloses a technique in which a wide area camera detects the color of a safety belt worn by an operator, and when the color is detected, it is determined whether the operator is present in an operating range of a work machine using a laser rangefinder. Patent Literature 3 discloses a technique in which a first stereo camera and a second stereo camera are attached with a predetermined interval therebetween to an upper part in a front direction of a cabin of a hydraulic excavator, and an obstacle is detected on the basis of stereo images captured by these stereo cameras.

CITATION LIST

Patent Literature

Patent Literature 1: JP 2001-64992 A
Patent Literature 2: JP 2012-225111 A
Patent Literature 3: JP 2014-215039 A

SUMMARY OF INVENTION

In the techniques disclosed in Patent Literatures 1 to 3, the position of the sensor may be displaced along with the use of the construction machine (displacement). In particular, when the position of the sensor is displaced from the position at the time of shipment from a factory by vibrations of the construction machine or an external force applied to the machine body, there is a problem in that the sensor cannot correctly grasp an environment around the construction machine.

It is an object of the present invention to provide a construction machine capable of detecting a displacement of a detection unit.

A construction machine according to one aspect of the present invention includes: a first structure; a second structure relatively rotatable around a predetermined shaft relative to the first structure; a detection unit that is disposed on the first structure, has a predetermined detection range, and detects environment data indicating information of an environment around the first structure; a position information acquisition unit that acquires position information of a specific part of the second structure with respect to the detection unit from the environment data detected by the detection unit; a storage unit capable of storing initial position information of the specific part, the initial position information being acquired from the environment data by the position information acquisition unit, and outputting the initial position information at initial setting when the second structure is disposed at an initial posture around the shaft, the initial posture being previously set so that the second structure is included in the detection range of the detection unit; and a displacement detection unit that compares comparative position information of the specific part, the comparative position information being acquired from the environment data by the position information acquisition unit, with the initial position information output from the storage unit to detect a displacement of the detection unit in the first structure when the second structure is brought into the initial posture again after the initial setting.

DESCRIPTION OF EMBODIMENTS

Figure 1:
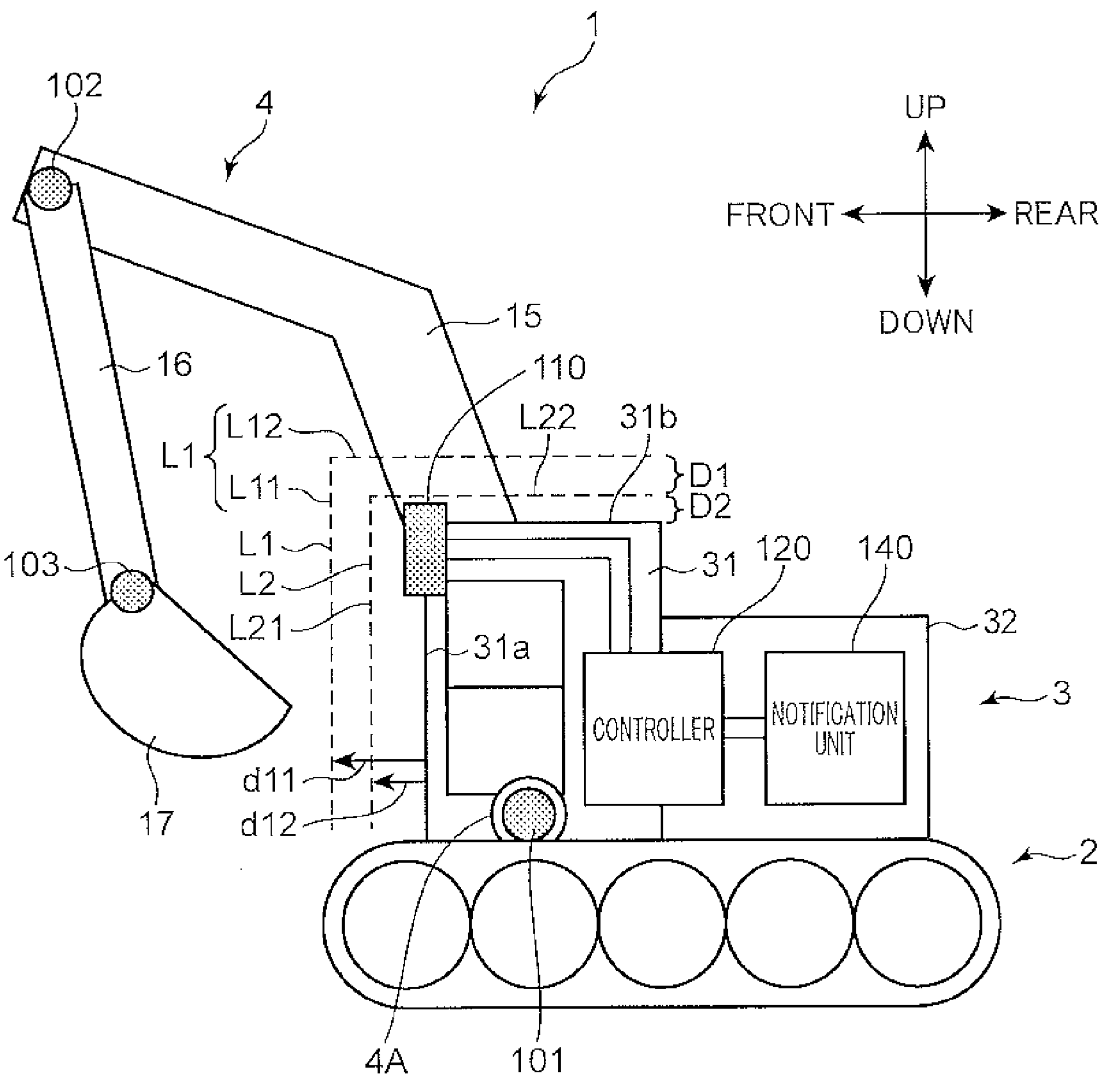
FIG. 1 is a schematic side view of a construction machine in an embodiment of the present invention.

Hereinbelow, each embodiment of the present invention will be described with reference to the drawings. FIG. 1 is a schematic side view of a construction machine 1 according to an embodiment of the present invention. Hereinbelow, a front direction, a rear direction, a left direction, a right direction, an up direction, and a down direction are based on a direction viewed from an operator cab 31. Further, the front direction and the rear direction are collectively described as a front-rear direction, and the up direction and the down direction are collectively described as an up-down direction. Further, the left direction and the right direction are collectively described as a right-left direction.

The construction machine 1 includes a crawler-type lower traveling body 2, an upper slewing body 3 (an example of a first structure and a vehicle body) which is slewably disposed on the upper part of the lower traveling body 2, and a work attachment 4 (an example of a second structure) whose posture is changeable, the work attachment 4 being attached to the upper slewing body 3. An upper body 32 is disposed on the upper slowing body 3 in addition to the operator cab 31.

The work attachment 4 is disposed adjacent to, for example, the right side of the operator cab 31, and raisably and lowerably attached to the upper slewing body 3. The work attachment 4 includes a boom 15, an arm 16 which is swingably attached to the distal end of the boom 15, and a bucket 17 (holding attachment) which is swingably attached to the distal end of the arm 16 (the distal end side of the boom 15). The bucket 17 is capable of holding a predetermined held object. Each of the boom 15, the arm 16, and the bucket 17 is capable of changing its posture by rotating around a predetermined shaft extending in a horizontal direction. In particular, the upper slewing body 3 rotatably supports the boom 15. In other words, the boom 15 is relatively rotatable around a predetermined shaft 4A relative to the upper slewing body 3. In addition to the bucket, a crusher and a demolition machine can be employed as the work attachment 4.

The upper slewing body 3 includes the operator cab 31 which is a box body and is occupied by an operator. In the operator cab 31, a face on the front side is defined as a front lace 31*a* and a face on the upper side is defined as an upper face 31*b* (FIG. 1).

A warning area D1 and an automatic restriction area D2 are set in this order from the front side in front of the operator cab 31. The warning area D1 is an area for notifying the operator that danger is approaching due to an interfering object approaching the operator cab 31 or restricting the operation of the work attachment 4 when the interfering object has entered the warning area D1. The automatic restriction area D2 is an area for automatically stopping or restricting the operation of the work attachment 4 when an interfering object has entered the automatic restriction area D2.

The warning area D1 is defined by a boundary surface L1 and a boundary surface L2. The boundary surface L1 includes a boundary surface L11 which faces the front face 31*a* and a boundary surface L12 which faces the upper face 31*b*. The boundary surface L11 is a plane which is set parallel to the front face 31*a* at a position away from the front face 31*a* to the front side by a distance d11. The boundary surface L12 is a plane which is set parallel to the upper lace 31*b* at a position away from the upper face 31*b* to the upper side by the distance d11.

The automatic restriction urea D2 is defined by the boundary surface L2, the front face 31*a*, and the upper face 31*b*. The boundary surface L2 includes a boundary surface L21 which faces the front face 31*a* and a boundary surface L22 which faces the upper face 31*b*. The boundary surface L21 is a plane which is set parallel to the front face 31*a* at a position away from the front face 31*a* to the front side by a distance d12 (<d11). The boundary surface L22 is a plane which is set away from the upper face 31*b* to the upper side by the distance d12.

The lowermost ends of the warning area D1 and the automatic restriction area D2 are located in front of the lower part of the operator cab 31. Further, the width in the right-left direction of each of the warning area D1 and the automatic restriction area D2 is set to the width in the right-left direction of the front face 31*a* or a width obtained by adding some margin to the width in the right-left direction of the front face 31*a*. However, these configurations are merely examples, and the position of the lowermost end and the width in the right-left direction of each of the warning area D1 and the automatic restriction area D2 may not be defined. Further, the warning area D and the automatic restriction area D2 may be set only in front of the front face 31*a* and may not be set above the upper face 31*b*. A three-dimensional coordinate system in which the warning area D and the automatic restriction area D2 are set is defined as a three-dimensional coordinate system of the construction machine 1.

A distance sensor 110 is disposed on the front face 31*a* of the operator cab 31 at a predetermined position (here, the upper end). The distance sensor 110 has a predetermined field of view (detection range) and acquires distance image data indicating a distance distribution of an environment around (here, on the front side of) the upper slewing body 3. Specifically, the distance sensor 110 is disposed on the front face 31*a* in such a manner that a measurement range thereof can cover the entire area of the boundary surface L21. Accordingly, there is no dead angle of the distance sensor 110 in the warning area D1 which faces the front face 31*a*. Thus, the construction machine 1 is capable of giving a warming to the operator before an interfering object enters the automatic restriction area D2. The distance sensor 110 constitutes a detection unit of the present invention.

The construction machine 1 further includes a first angle sensor 101, a second angle sensor 102, and a third angle sensor 103. The first angle sensor 101 is disposed on a rotation supporting point (shaft 4A) of the boom 15 to measure a rotation angle of the boom 15 around the shaft. The second angle sensor 102 is disposed on a rotation supporting point of the arm 16 to measure a rotation angle of the arm 16 around the shaft. The third angle sensor 103 is disposed on a rotation supporting point of the bucket 17 to measure a rotation angle of the bucket 17 around the shaft.

The upper slewing body 3 is provided with a controller 120 which is electrically connected to the distance sensor 110 to control the entire construction machine 1. Further, a notification unit 140 is disposed inside the operator cab 31. The notification unit 140 notifies the operator of a state of the construction machine 1 under the control of the controller 120.

Figure 2:
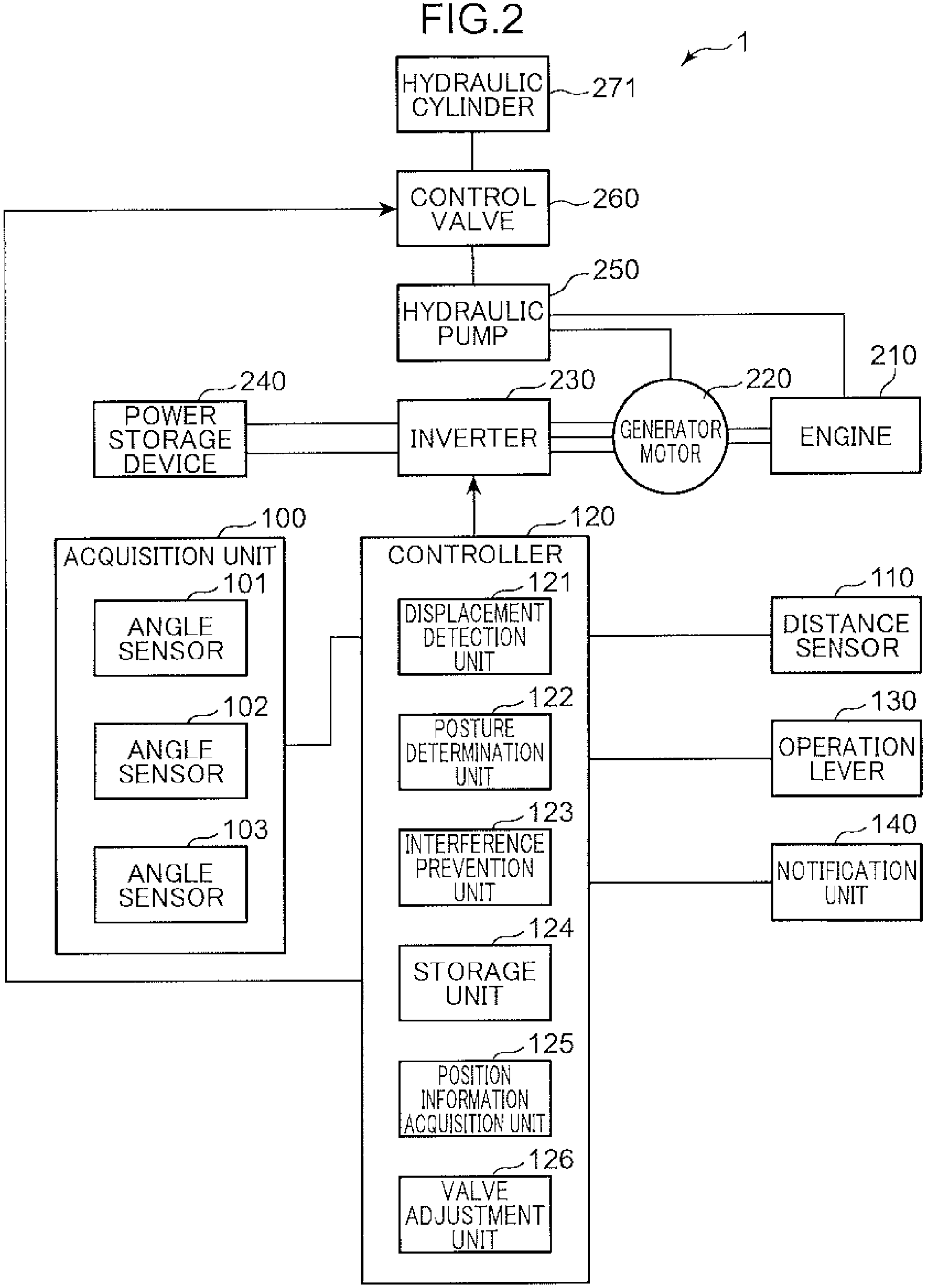
FIG. 2 is a block diagram illustrating an example of a system configuration of the construction machine illustrated in FIG. 1.

FIG. 2 is a block diagram illustrating an example of a system configuration of the construction machine 1 illustrated in FIG. 1. The construction machine 1 includes an engine 210, a hydraulic pump 250 and a generator motor 220 which are coupled to an output shaft of the engine 210, a control valve 260 which controls the supply and discharge of a hydraulic oil with respect to a hydraulic cylinder 271 through the hydraulic pump 250, a power storage device 240 which is capable of being charged with electric power generated by the generator motor 220, and an inverter 230 which performs electric power conversion between the power storage device 240 and the generator motor 220.

The hydraulic pump 250 is operated by the power of the engine 210 and discharges a hydraulic oil. The hydraulic oil discharged from the hydraulic pump 250 is guided to the hydraulic cylinder 271 at a flow rate controlled by the control valve 260. A pilot valve and a proportional valve are disposed inside the control valve 260.

The controller 120 includes a valve adjustment unit 126 (FIG. 2) which sets an opening degree of the proportional valve inside the control valve 260 in accordance with an operation amount of an operation lever 130.

The hydraulic cylinder 271 extends and contracts with the hydraulic oil supplied thereto. Each of a boom cylinder which raises and lowers the boom 15 with respect to the upper slewing body 3, an arm cylinder which swings the arm 16 with respect to the boom 15, and a bucket cylinder which swings the bucket 17 with respect to the arm 16 constitutes an example of the hydraulic cylinder 271. Each of the cylinders is provided with the control valve 260 described above. Each of the cylinders can be independently controlled upon receipt of a control signal of the controller 120.

The generator motor 220 is provided with a configuration as a generator which converts the power of the engine 210 to electric power and a configuration as a motor which converts electric power stored in the power storage device 240 to power. In the example of FIG. 2, the generator motor 220 includes, for example, a three-phase motor. However, this is merely an example, and the generator motor 220 may include a single-phase motor.

Examples of the power storage device 240 include various secondary batteries such as a lithium ion battery, a nickel-metal hydride battery, an electric double layer capacitor, and a lead battery.

The inverter 230 controls switching between an operation of the generator motor 220 as a generator and an operation of the generator motor 220 as a motor under the control of the controller 120. Further, the inverter 230 controls current to the generator motor 220 and a torque of the generator motor 220 under the control of the controller 120. In the example of FIG. 2, the inverter 230 includes, for example, a three-phase inverter. However, this is merely an example, and the inverter 230 may include a single-phase inverter.

Figure 3:
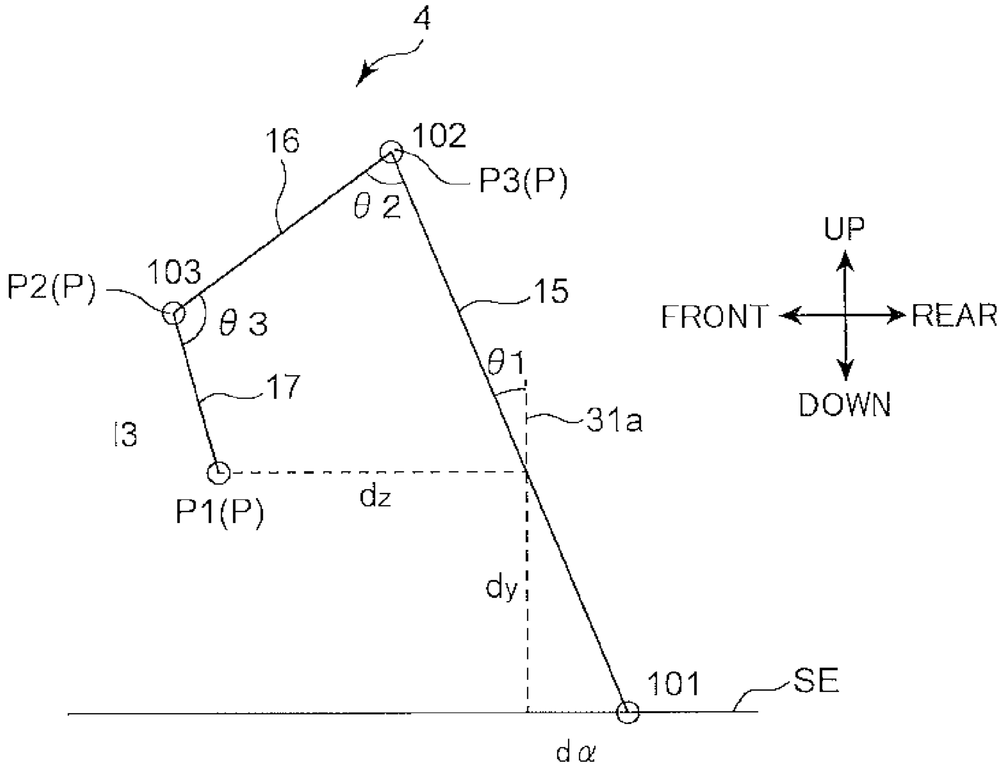
FIG. 3 is a diagram illustrating a work attachment of the construction machine in the embodiment of the present invention in a simplified manner.
Figure 4:
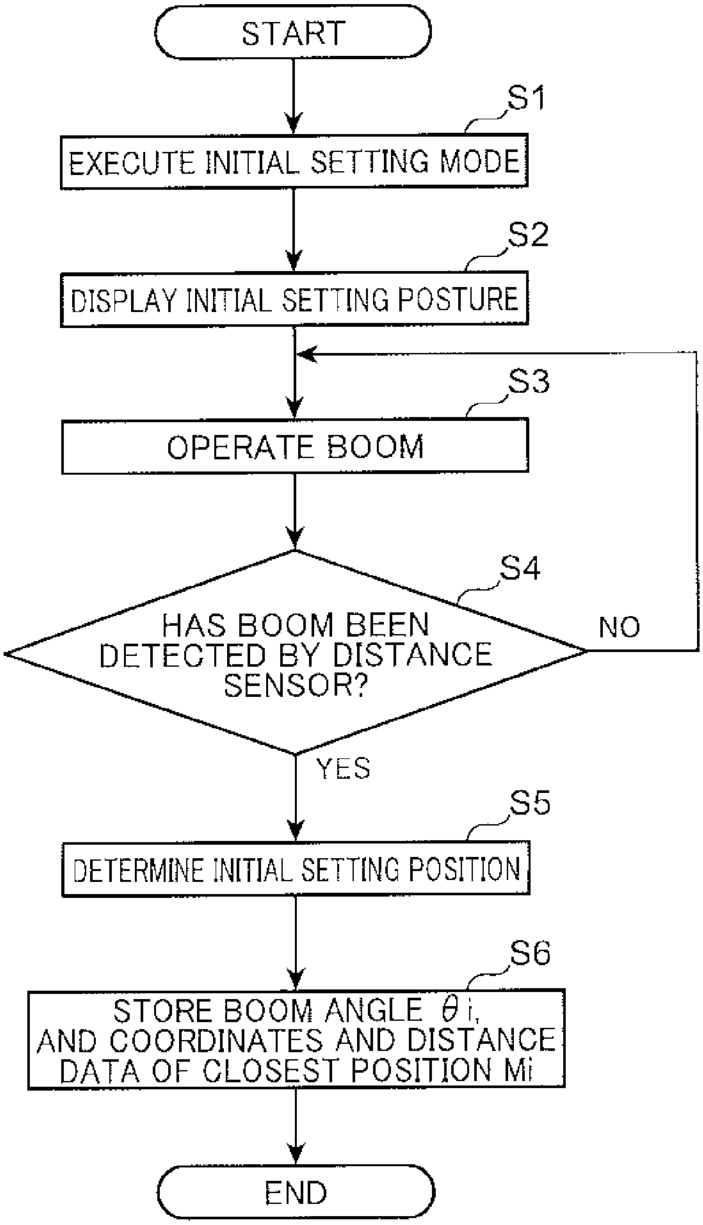
FIG. 4 is a flowchart illustrating a process at initial setting of the construction machine in the embodiment of the present invention.
Figure 5:
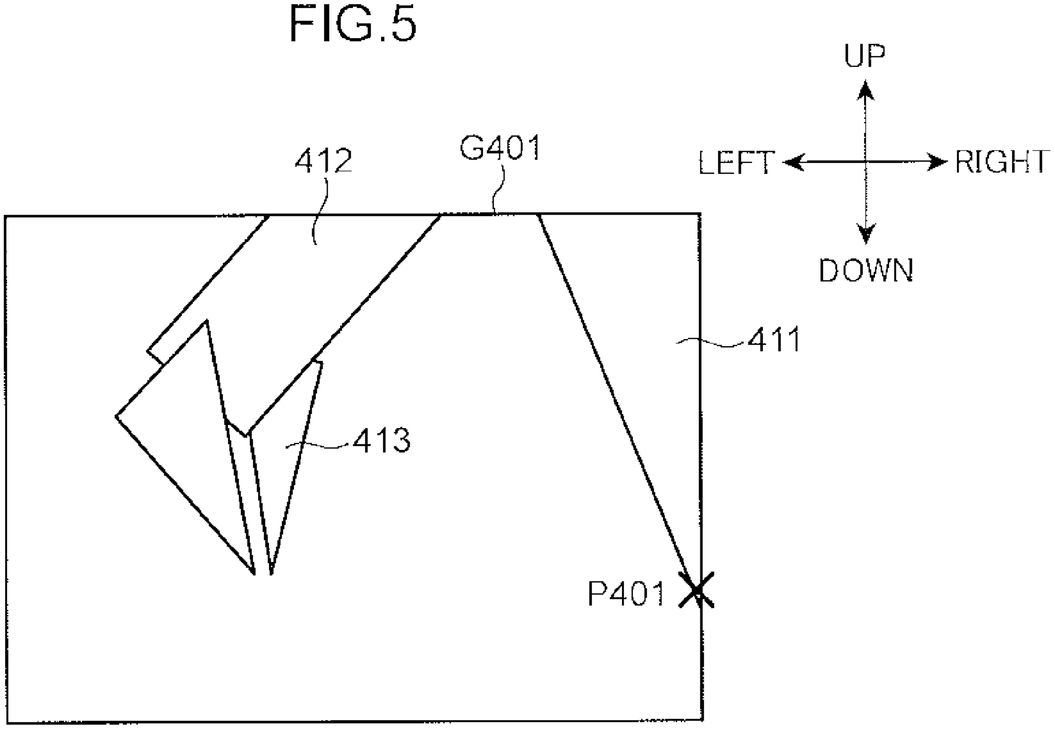
FIG. 5 is a diagram illustrating distance image data including a second structure superimposed on a coordinate area of the construction machine in the embodiment of the present invention.
Figure 6:
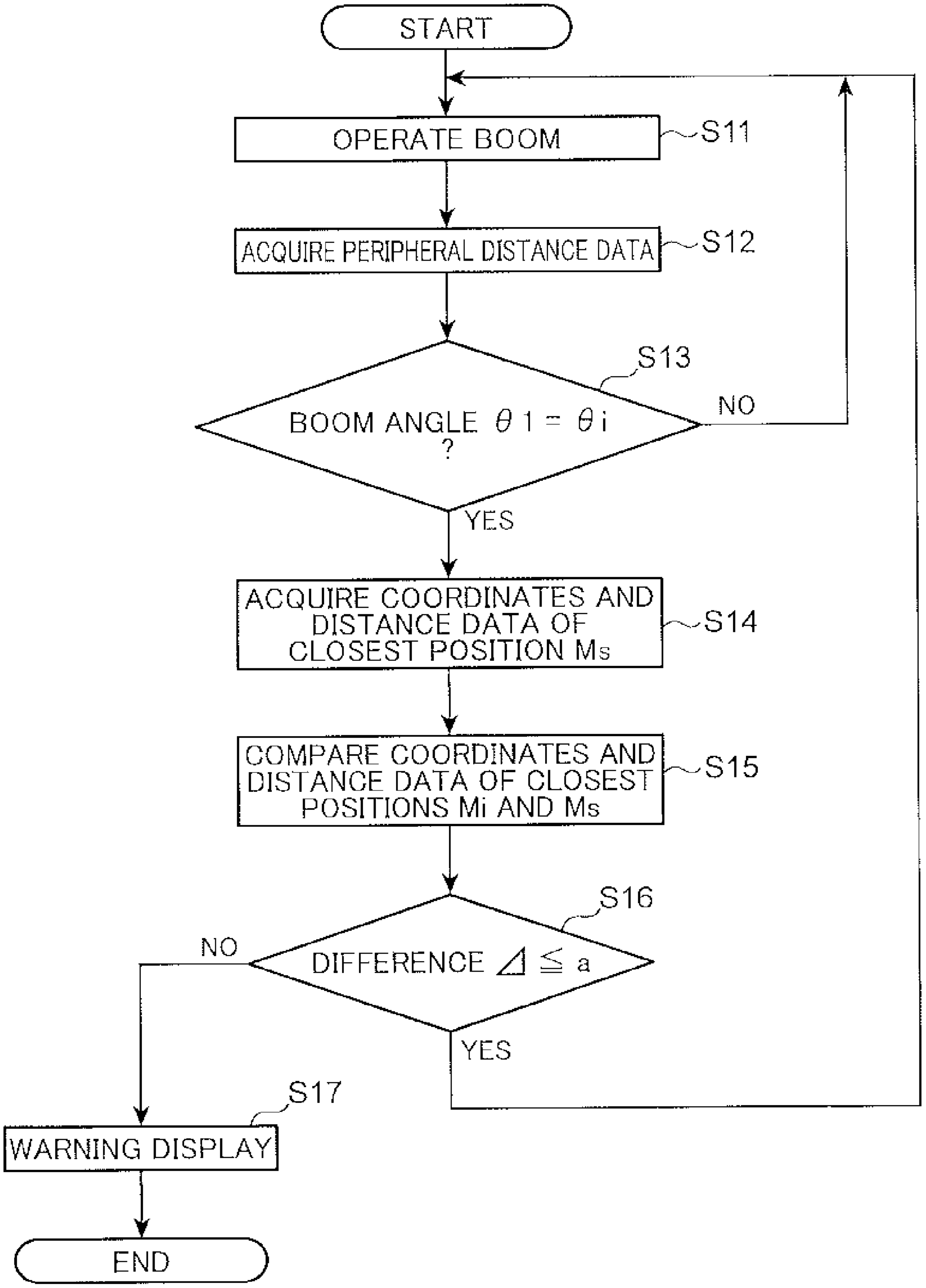
FIG. 6 is a flowchart illustrating a process during the use of the construction machine in the embodiment of the present invention.

FIG. 3 is a diagram illustrating the work attachment 4 in a simplified manner. FIG. 4 is a flowchart illustrating a process at initial setting of the construction machine 1 in the present embodiment. FIG. 5 is a diagram illustrating distance image data including the work attachment 4 superimposed on a coordinate area of the construction machine 1. FIG. 6 is a flowchart illustrating a process (displacement determination process) during the use of the construction machine 1.

The construction machine 1 further includes an acquisition unit 100 (posture information acquisition unit) (FIG. 2), the distance sensor 110, the controller 120, and the notification unit 140 which are illustrated in FIG. 1, and the operation lever 130 which receives an operation for changing the posture of the work attachment 4 by the operator (FIG. 2).

The acquisition unit 100 includes the first angle sensor 101, the second angle sensor 102, and the third angle sensor 103 which are described above with reference to FIG. 1, and acquires posture information indicating the posture of the work attachment 4 (second structure). Here, the rotation angle of the boom 15, the rotation angle of the arm 16, and the rotation angle of the attachment 17 correspond to the posture information.

The distance sensor 110 is disposed in such a manner that a field of view thereof includes the front side of the operator cab 31, and measures the distance from the distance sensor 110 to an object located around the operator cab 31. In the present embodiment, the distance sensor 110 includes, for example, a depth sensor which is provided with a light source which applies infrared rays, a camera which is capable of receiving infrared rays and visible light, and a processor which processes image data captured by the camera. The distance sensor 110, for example, applies infrared rays at each certain time (e.g., 30 fps), measures time from the application of infrared rays to the reception of reflected light in the unit of pixel, and acquires distance image data indicating a distance distribution of an environment around the operator cab 31.

The depth sensor which applies infrared rays has recently been put to practical use as distance measuring means in increasing examples, and is utilized as an input interface for inputting a gesture in a game. Further, the construction machine 1 may be used during the night. Thus, the depth sensor using infrared rays is useful for the construction machine 1. In the depth sensor which applies infrared rays, a system for measuring the time from the application of infrared rays to the reception of reflected light as described above is known as a time of flight (ToF) system. In addition, a structured light system which measures a distance from a light receiving pattern of reflected light when a specific pattern is applied is known as the depth sensor. The depth sensor of the structured light system may be employed. The construction machine 1 often operates outdoors. Thus, the depth sensor of a laser scanning ToF system which is resistant to interference with sunlight may be employed. Highly reliable and practical characteristics of the depth sensor which applies infrared rays achieve a stable detection operation of the distance sensor 110.

Here, the depth sensor is used as the distance sensor 110. However, the present invention is not limited thereto, and the distance sensor 110 may include a stereo camera which is cheaper than the depth sensor. In this case, the distance sensor 110 includes, for example, a stereo camera and a processor which calculates a distribution of the distance to an object from a plurality of pieces of image data captured by a plurality of cameras constituting the stereo camera. Low-cost, highly-reliable, and practical characteristics of the stereo camera achieve a stable detection operation of the distance sensor 110.

The operation lever 130 is, for example, operated by the operator, and outputs a signal indicating the operation amount to the controller 120.

The controller 120 includes, for example, a processor such as a microcontroller and a storage device which stores a program. The controller 120 includes a displacement detection unit 121, a posture determination unit 122, an interference prevention unit 123, a storage unit 124, and a position information acquisition unit 125. Each of the displacement detection unit 121, the posture determination unit 122, the interference prevention unit 123, the storage unit 124, and the position information acquisition unit 125 may include a dedicated hardware circuit or may be implemented by executing a program by a CPU.

The displacement detection unit 121 has a function of detecting a displacement of the distance sensor 110 with respect to the operator cab 31 of the upper slewing body 3.

The posture determination unit 122 compares posture information acquired by the acquisition unit 100 after initial setting with initial posture information stored in the storage unit 124 to determine that the boom 15 of the work attachment 4 has become an initial posture again.

The interference prevention unit 123 detects an interfering object which is the work attachment 4 or a held object held by the work attachment 4 using the distance image data acquired by the distance sensor 110 and determines the risk of interference of the detected interfering object with the operator cab 31. Further, when the interference prevention unit 123 determines that there is a risk of interference, the interference prevention unit 123 performs at least one of notification of the risk and restriction of the operation of the construction machine 1.

The storage unit 124 is capable of previously storing and outputting initial position information of the boom 15, the initial position information being acquired by the position information acquisition unit 125 at initial setting (described below). Further, the storage unit 124 is capable of previously storing and outputting initial posture information of the boom 15, the initial posture information being acquired by the acquisition unit 100 at the initial setting.

The position information acquisition unit 125 acquires position information (pixel data) of a specific part of the boom 15 with respect to the distance sensor 110 from the distance image data acquired by the distance sensor 110.

In FIG. 3, the boom 15, the arm 16, and the attachment 17 are indicated by straight lines for simplifying description. In the example of FIG. 3, in the coordinate system of the construction machine 1, the front face 31*a* is set at an origin point in the front-rear direction, a reference plane SE is set at an origin point in the up-down direction, and the center in the right-left direction of the front face 31*a* is set at an origin point in the right-left direction.

The length of the boom 15, the length of the arm 16, and the length of the attachment 17 are known. Further, a distance do in the front-rear direction between the front face 31*a* of the operator cab 31 and the angle sensor 101 is also known. Thus, when the rotation angle θ1 of the boom 15 with respect to the front face 31*a*, the rotation angle θ2 of the arm 16 with respect to the boom 15, and the rotation angle θ3 of the attachment 17 with respect to the arm 16 are obtained, an altitude dy and a depth dz of a representative point P (e.g., the distal end P1 of the attachment 17, the distal end P2 of the arm, the distal end P3 of the boom) of the work attachment 4 can be calculated by using a trigonometric function. Here, the altitude dy indicates, for example, the distance in the up-down direction from the reference plane SE, which is parallel to the front-rear direction, to the point P, and the depth dz indicates, for example, the distance in the front-rear direction from the front face 31*a* to the point P.

Thus, when the rotation angles θ1 to θ3 acquired by the acquisition unit 100 are obtained, the position of the point P in the three-dimensional coordinate system of the construction machine 1, that is, in a real space can be identified. When the point P is obtained, it is possible to determine a coordinate area including the boom 15, the arm 16, and the attachment 17 in distance image data measured by the distance sensor 110 from the view angle, the attached position, and the angle of the optical axis of the distance sensor 110. As a result, the position information acquisition unit 125 can acquire position information (pixel data) corresponding to the boom 15 from the distance image data acquired by the distance sensor 110.

In the present embodiment, the position information acquisition unit 125 has correspondence information previously indicating a coordinate area where the boom 15 is located inside the distance image data in accordance with posture information acquired by the acquisition unit 100. The position information acquisition unit 125 determines position information corresponding to the boom 15 in accordance with the posture information measured by the angle sensor of the acquisition unit 100 using the correspondence information.

For example, data of the rotation angle θ1 of the boom 15 associated with a plurality of representative points on the outer edge of a coordinate area corresponding to the rotation angle θ1 can be employed as the correspondence information. For example, the coordinates of a vertex of the coordinate area can be employed as the representative point. In the example of rectangular distance image data G401 illustrated in FIG. 5, a coordinate area 411 indicates the boom 15, but includes no vertex. In this case, for example, coordinates of three vertexes of the triangle coordinate area 411 included in the distance image data G401 can be employed as the representative point. In particular, the position information acquisition unit 125 can acquired, as the position information of the boom 15, data of a closest position closest to the distance sensor 110 (0401 in FIG. 5) in the distance image data (coordinate area 411) of the boom 15 included in the distance image data G401 (the field of view of the distance sensor 110) illustrated in FIG. 5. In FIG. 5, the coordinate areas 412 and 413 correspond to the arm 16 and the bucket 17, respectively.

The interference prevention unit 123 detects an interfering object which is the work attachment 4 or a held object held by the work attachment 4 using the distance image data acquired by the distance sensor 110 and determines the risk of interference of the detected interfering object with the operator cab 31. The interference prevention unit 123 determines the risk of interference by the interfering object according to whether the depth of the detected interfering object is located in the warning area D1 or the automatic restriction area D2. Specifically, the interference prevention unit 123 may determine that the interfering object is located at coordinates having the smallest depth in the distance image data and detect the depth of the coordinates as the depth of the interfering object. Then, the interference prevention unit 123 may transform the height and depth of the detected interfering object from the three-dimensional coordinate system of the distance sensor 110 to the three-dimensional coordinate system of the construction machine 1 and determine whether the transformed height and depth are located in the warning area D1 or the automatic restriction area D2.

Alternatively, the interference prevention unit 123 may determine whether the interfering object has entered the warning area D1 and the automatic restriction area D2 by using only the depth. In this case, the interference prevention unit 123 may transform the minimum depth in the distance image data to the three-dimensional coordinate system of the construction machine 1, and determine that the interfering object has entered the automatic restriction area D2 when the obtained depth is located within the range of the distance d12 from the front face 31*a* and determine that the interfering object has entered the warning area D1 when the obtained depth is located within the range of the distance d12 or more and the distance d11 or less from the front face 31*a*.

Further, when the interference prevention unit 123 determines that there is a risk of interference, the interference prevention unit 123 performs at least one of the warning to the operator and the restriction of the operation of the work attachment 4. Specifically, when the interference prevention unit 123 determines that the interfering object is located in the warning area D1, the interference prevention unit 123 causes the notification unit 140 to give a warning. As a mode of the warning, a mode that sounds a buzzer, a mode that lights or flashes a warning lamp, or a mode that displays a warning message on a display panel can be employed. Alternatively, a mode of the combination of these modes may be employed as the mode of the warning. Further, when the interference prevention unit 123 determines that the interfering object is located in the automatic restriction area D2, the interference prevention unit 123 restricts the operation of the work attachment 4 by decelerating or automatically stopping the work attachment 4.

In this case, the interference prevention unit 123 may decelerate the work attachment 4 by correcting the opening degree of the proportional valve of the control valve 260, the opening degree being set by the valve adjustment unit 126 in accordance with the operation amount of the operation lever 130, in a direction for decelerating the work attachment 4. Further, in this case, the interference prevention unit 123 may increase a deceleration amount of the work attachment 4 as the depth of the interfering object approaches the operator cab 31. The notification unit 140 is provided with a buzzer, a display panel, and a warning lamp which are disposed inside the operator cab 31, and gives a warning to the operator under the control of the interference prevention unit 123.

Next, a displacement determination process for the distance sensor 110, the displacement determination process being executed by the displacement detection unit 121 according to the present embodiment, will be described in detail with reference to FIGS. 4 to 6.

Referring to FIG. 4, in a factory where the construction machine 1 is manufactured, predetermined initial setting is executed at the time of shipment. The display panel disposed inside the operator cab 31 is provided with a switch button for executing an initial setting mode. When the operator presses the switch button, the controller 120 starts the initial setting mode of the construction machine 1 (step S1 of FIG. 4). Then, the controller 120 displays an "initial setting posture" of the boom 15 on the display panel (step S2). Here, the initial setting posture is a posture of the boom 15 around the shaft, the posture being previously set so that the boom 15 is included in the field of view of the distance sensor 110. The initial setting posture of the boom 15, the initial setting posture being displayed on the display panel, includes the rotation angles θ1 no θ3 of the boom 15, the arm 16, and the bucket 17, the rotation angles θ1 to θ3 being detected by the angle sensors 101, 102, and 103, respectively. When the rotation angles θ1 to θ3 are set to previously set values, the posture of the work attachment 4 with respect to the upper slewing body 3 is fixed.

The operator operates the operation lever 130 while looking at the rotation angles θ1 to θ3 displayed on the display panel to bring the work attachment 4, in particular, the boom 15 close to the initial setting posture (step S3). Then, the controller 120 determines whether the boom 15 has been detected by the distance sensor 110 (step S4). As described above, the position information acquisition unit 125 has correspondence information previously indicating a coordinate area where the boom 15 is located inside the distance image data of the distance sensor 110 in accordance with posture information acquired by the acquisition unit 100. Thus, the controller 120 can determine whether the boom 15 has been detected by the distance sensor 110 using the correspondence information.

When the boom 15 has been detected by the distance sensor 110 (YES in step S4), the controller 120 determines the posture of the boom 15 at this time as the initial setting position (initial posture) (step S5). When the boom 15 has not been detected by the distance sensor 110 in step S4 (NO in step S4), the controller 120 waits until the boom 15 is detected by a further operation of the boom 15 by the operator.

When the initial setting position is determined in step S5, the controller 120 stores an angle θi (initial posture information) of the boom 15, the angle θi being detected by the first angle sensor 101 at this time, in the storage unit 124 (step S6). Further, the controller 120 controls the position information acquisition unit 125 to acquire initial position information of the boom 15 from distance image data acquired by the distance sensor 110 in the initial posture of the boom 15. In the present embodiment, the initial position information corresponds to data (coordinates, distance data) of a closest position Mi closest to the distance sensor 110 in the distance image data of the boom 15 included in the field of view of the distance sensor 110. In FIG. 5, corresponding to the boom 15, data of the closest position P401 in the triangle coordinate area 411 included in the distance image data (401 is acquired by the position information acquisition unit 125. The controller 120 stores the initial position information of the boom 15, the initial position information being acquired by the position information acquisition unit 125, in the storage unit 124 (step S6). As a result, the initial setting mode of the construction machine 1 is finished.

When the initial setting mode is finished, and the construction machine 1 shipped from the factory is installed in a used site, the displacement determination process is executed. In the present embodiment, the displacement determination process is continuously executed during the use of the construction machine 1. Referring to FIG. 6, when the use of the construction machine 1 is started, the operator operates the operation lever 130 (FIG. 2) to rotate the boom 15 (step S11). At this time, the controller 120 controls the distance sensor 110 to acquire distance image data around the construction machine 1 and stores the acquired distance image data in the storage unit 124 (step S12). Since a storage capacity of the storage unit 124 is limited, the latest distance image data for a predetermined time (e.g., one minute) may be stored in the storage unit 124.

When the boom 15 is operated, the posture determination unit 122 determines that the boom 15 has become the initial posture again before long (step S13). Specifically, the posture determination unit 122 compares the rotation angle θ1 (posture information) of the boom 15, the rotation angle θ1 being acquired by the angle sensor 101 of the acquisition unit 100, with the angle θi (initial posture information) stored in the storage unit 124. Then, when θ1: θi is satisfied (YES in step S13), the posture determination unit 122 determines that the boom 15 has become the initial posture again. The position information acquisition unit 125 acquires comparative position information of the boom 15 from distance image data when θ1=θi is satisfied, the distance image data being stored in the storage unit 124 (step S14). In the present embodiment, in a manner similar to the initial position information at the initial setting, the comparative position information corresponds to data (coordinates, distance data) of a closest position Ms closest to the distance sensor 110 in the distance image data of the boom 15 included in the field of view of the distance sensor 110.

The displacement detection unit 121 compares the comparative position information including data (coordinates, distance data) of the closest position Ms with the initial position information including data (coordinates, distance data) of the closest position Mi at the initial setting, the initial position information being stored in the storage unit 124 (step S15). Here, when the difference Δ between the comparative position information and the initial position information≤a (YES in step S16), the displacement detection unit 121 determines that there is no displacement in the distance sensor 110 fixed to the operator cab 31. In this case, steps S11 to S16 are repeated while the use of the construction machine 1 is continued. A value of a threshold "a" compared in step S16 is determined by a previously performed experiment and stored in the storage unit 124.

On the other hand, when the difference Δ between the comparative position information and the initial position information>a (NO in step S16), the displacement detection unit 121 determines that there is a displacement in the distance sensor 110 fixed to the operator cab 31. In this case, the displacement detection unit 121 causes the notification unit 140 to notify warning information of the displacement (step S17). When the operator corrects the displacement of the distance sensor 110, the displacement detection process by the displacement detection unit 121 is finished.

As described above, according to the present embodiment, the displacement of the distance sensor 110 with respect to the operator cab 31 can be detected by comparing pieces of position information corresponding to the boom 15 in the distance image data acquired by the distance sensor 110 between the initial setting time and the time when the boom 15 becomes the initial posture again after the initial setting. In particular, the distance sensor 110 acquires the distance image data with the boom 15 as the second structure fixed at the initial posture. When the distance sensor 110 is displaced, position information of the boom 15 included in the distance image data is displaced. That is, when the distance sensor 110 is displaced in a direction away from the boom 15 from the position at the initial setting, the boom 15 is detected at a farther position than the position at the initial setting on the acquired position information. The displacement of the distance sensor 110 is detected using the difference. Further, data of the closest position Ms closest to the distance sensor 110 in the distance image data is acquired as the position information corresponding to the boom 15. In the field of view of the distance sensor 110 (FIG. 5), the closest position Ms (P401 of FIG. 5) is an intersection point of the side edge of the boom 15 and the outer peripheral line of the distance image data. Thus, the closest position Ms is determined at a single point. Accordingly, a processing operation executed by the position information acquisition unit 125 to determine position information and a load are reduced. Thus, it is possible to easily and efficiently acquire the position information of the boom 15 from the distance image data.

Further, in the present embodiment, it is determined that the boom 15 has become the initial posture again after the shipment of the construction machine 1 on the basis of posture information of the boom 15, the posture information being acquired by the acquisition unit 100. Thus, it is possible to easily determine the timing when the displacement detection unit 121 checks the displacement of the distance sensor 110. In other words, it is not necessary for the operator to adjust the posture of the boom 15 to the initial posture for a displacement detection operation. Further, in the present embodiment, it is possible to easily detect that the boom 15 has become the initial posture using the rotation angle θ1 of the boom 15, the rotation angle θ1 being detected by the first angle sensor 101. Further, in the present embodiment, it is possible to detect the displacement of the distance sensor 110 using the boom 15 included in the field of view of the distance sensor 110. In particular, the boom 15 extends toward the front side away from the distance sensor 110 disposed on the operator cab 31. Thus, the closest position of the boom 15 is easily uniquely determined in the field of view of the distance sensor 110, and the displacement detection process for the distance sensor 110 is stably executed.

Further, in the present embodiment, the interference prevention unit 123 executes the interference prevention process operation for preventing the interference of the work attachment 4 or a held object with the operator cab 31 on the basis of the distance image data acquired by the distance sensor 110. Thus, when the displacement of the distance sensor 110 occurs, false recognition of the distance sensor 110 occurs, and the interference prevention process operation is not correctly executed. Thus, the interference prevention process operation by the interference prevention unit 123 can be correctly executed by executing the displacement detection process for the distance sensor 110 as described above.

The construction machine 1 according to the embodiment of the present invention has been described above. Note that the present invention is not limited to these modes. Modifications as described below can be employed as the construction machine according to the present invention.

Figure 7:
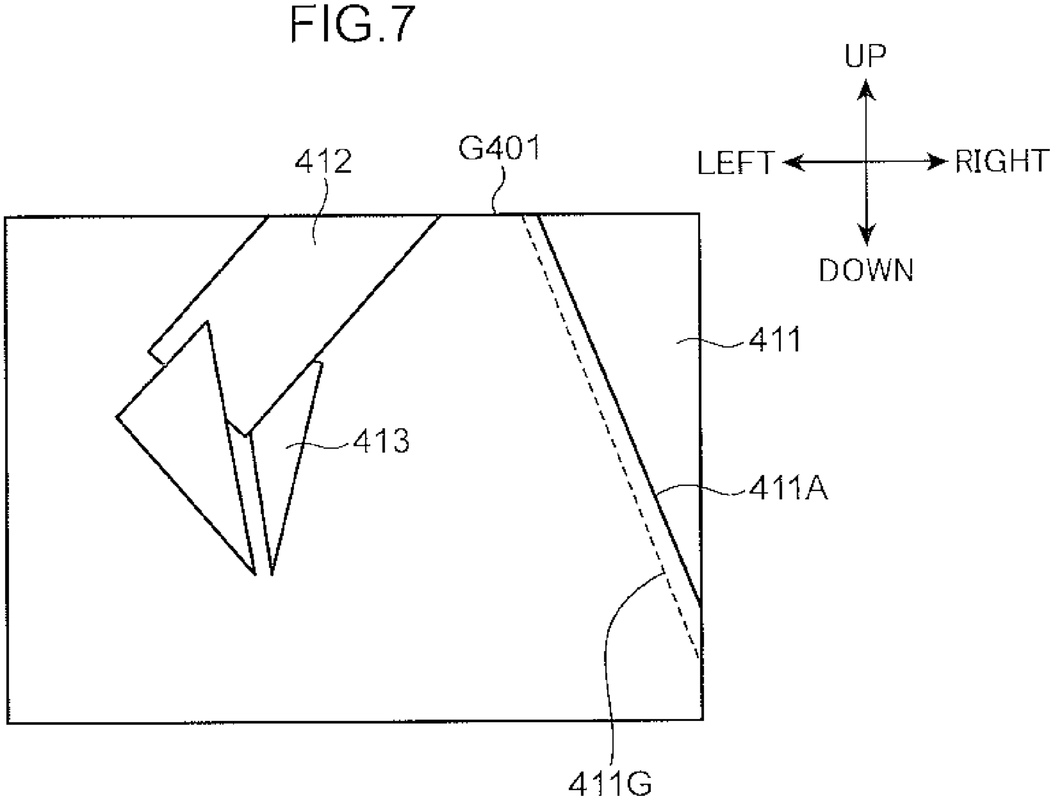
FIG. 7 is a diagram illustrating distance image data including a second structure superimposed on a coordinate area of a construction machine in a modification of the present invention.

(1) The above embodiment describes a mode in which the position information acquisition unit 125 acquires, as position information, data of the closest position Ms closest to the distance sensor 110 in the distance image data of the boom 15 included in the field of view of the distance sensor 110. However, the present invention is not limited thereto. FIG. 7 is a diagram illustrating distance image data including the work attachment 4 (FIG. 1) including the boom 15 (second structure), the work attachment 4 being superimposed on a coordinate area G401 of a construction machine in a modification of the present invention. In the present modification, the position information acquisition unit 125 (FIG. 2) acquires a side edge 411 (411G, 411A) of a coordinate area 411 corresponding to the boom 15 as position information. That is, at initial setting, coordinates (initial position information) of the side edge 411G of the boom 15 included in the distance image data are stored in the storage unit 124. On the other hand, when the construction machine 1 is used, and the boom 15 is brought into the initial posture again, coordinates (initial position information) of the side edge 411A of the boom 15 included in the distance image data are acquired. Also in this case, the displacement detection unit 121 (FIG. 2) can detect the displacement of the distance sensor 110 with respect to the operator cab 31 of the upper slewing body 3 by comparing the acquired comparative position information with the initial position information stored in the storage unit 124.

Figure 8A:
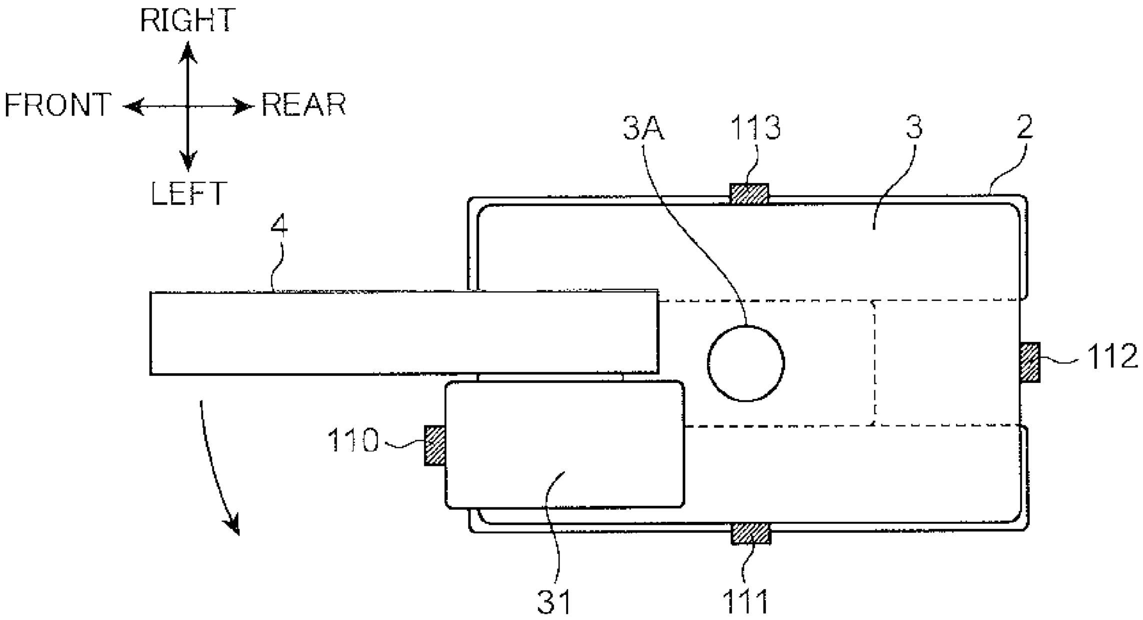
FIG. 8A is a plan view of a construction machine in a modification of the present invention.
Figure 8B:
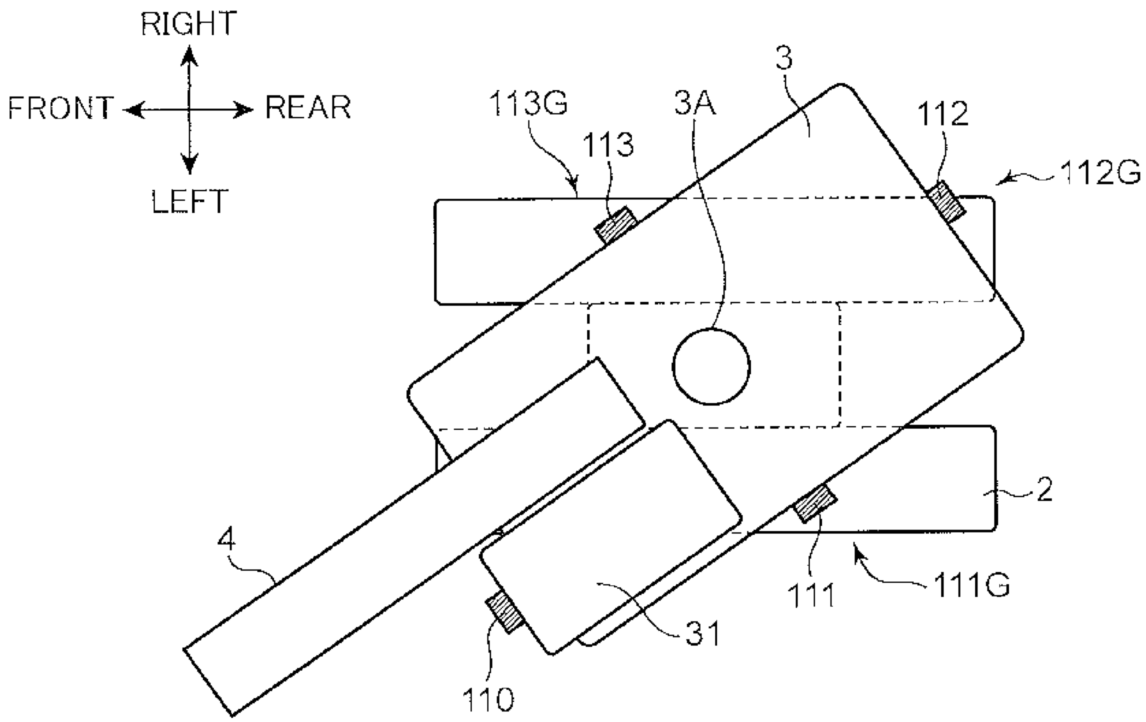
FIG. 8B is a plan view illustrating a state of an upper slewing body slewed from a state illustrated in FIG. 8A.

(2) Further, the above embodiment describes a mode in which the upper slewing body 3 constitutes the first structure of the present invention, and the boom 15 of the work attachment 4 constitutes the second structure of the present invention. However, the present invention is not limited thereto. The second structure may be the entire work attachment 4, or the arm 16 or the bucket 17 (holding attachment) may function as the second structure or may be included in the second structure. Further, FIG. 8A is a plan view of a construction machine in a modification of the present invention. The present modification differs from the above embodiment mainly in that a lower traveling body 2 functions as the second structure of the present invention. Thus, the difference will be mainly described. FIG. 8B is a plan view illustrating a state of an upper slewing body 3 slewed from a state illustrated in FIG. 8A.

The upper slewing body 3 slews with respect to the lower traveling body 2 around a shaft 3A extending in the vertical direction. In other words, the lower traveling body 2 rotates relative to the upper slewing body 3 around the shaft 3A. The shaft 3A of the upper slewing body 3 and the lower traveling body 2 is provided with an angle sensor (not illustrated) which detects a rotation angle of the upper slewing body 3. The posture of the upper slewing body 3 with respect to the lower traveling body 2 is detected by an output of the angle sensor. The upper slewing body 3 includes a work attachment 4 and an operator cab 31. In a manner similar to the above embodiment, the operator cab 31 is provided with a distance sensor 110. Further, in the present modification, a left distance sensor 111 is disposed on the left side part of the upper slewing body 3, and a rear distance sensor 112 is disposed on the rear part of the upper slewing body 3. Further, a right distance sensor 113 is disposed on the right side part of the upper slewing body 3. The left distance sensor 111, the rear distance sensor 112, and the right distance sensor 113 detect that an operator or an obstacle is not present around the construction machine. As a result, it is possible to safely perform the operation of the construction machine. The construction machine may be provided with any of the left distance sensor 111, the rear distance sensor 112, and the right distance sensor 113.

In the present modification, when the upper slewing body 3 slews as indicated by an arrow from a normal posture illustrated in FIG. 8A, the upper slewing body 3 is brought into a posture illustrated in FIG. 8B. The posture illustrated in FIG. 8B corresponds to an initial setting posture (initial posture) of the lower traveling body 2 in which initial setting of each sensor according to the present modification can be performed. In the normal posture illustrated in FIG. 8A, that is, the posture in which the front-rear direction of the upper slewing body 3 is aligned with the front-rear direction of the lower traveling body 2, the lower traveling body 2 is not included in field of views of the left distance sensor 111, the rear distance sensor 112, and the right distance sensor 113. On the other hand, in the initial posture illustrated in FIG. 8B, the left distance sensor 111 can detect a left target 111G which is the left side part of the lower traveling body 2. Similarly, the rear distance sensor 112 can detect a rear target 112G which is the rear part of the lower traveling body 2, and the right distance sensor 113 can detect a right target 113G which is the right side part of the lower traveling body 2. The left target 111G, the rear target 112G, and the right target 113G are acquired as position information, and a displacement detection process similar to the displacement detection process of the above embodiment is executed. As a result, displacements of the left distance sensor 111, the rear distance sensor 112, and the right distance sensor 113 can be accurately detected. In this manner, in the present modification, the displacements of the distance sensors disposed on the upper slewing body 3 can be detected using the lower traveling body 2 included in the field of view (detection range) of each of the distance sensors. Note that the present modification is not limited to the above configuration, and a distance sensor (not illustrated) may be disposed on the front face part of the operator cab 31. Also in this case, the lower traveling body 2 may be included in the field of view of the distance sensor in the initial setting posture (initial posture) of the lower traveling body 2.

Figure 9:
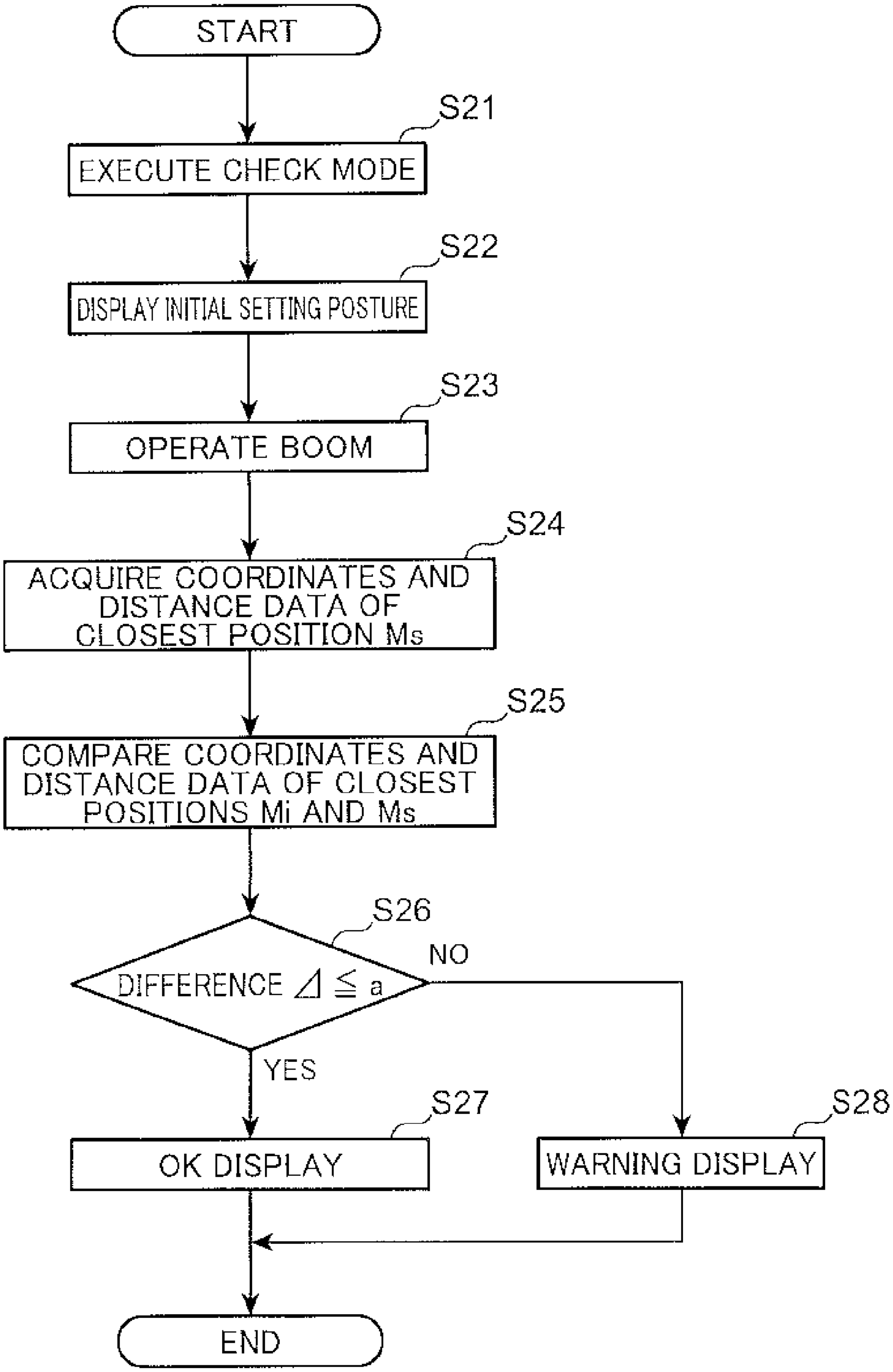
FIG. 9 is a flowchart illustrating a process during the use of a construction machine in a modification of the present invention.

(3) Further, the above embodiment describes a mode in which the displacement detection unit 121 detects a displacement of the distance sensor 110 during the user of the construction machine 1. However, the present invention is not limited thereto. FIG. 9 is a flowchart illustrating a process during the user of a construction machine in a modification of the present invention. In the present modification, a displacement detection operation for the distance sensor 110 (FIG. 1) is executed with the intention of an operator during the use of the construction machine. Note that, also in the present modification, the initial setting of FIG. 3 is executed at the time of shipment of the construction machine from the factory.

The operator operates the display panel inside the operator cab 31 to execute a check mode of displacement detection (step S21). As a result, in a manner similar to the initial setting in the above embodiment, an "initial setting posture" of the boom 15 (FIG. 1) is displayed on the display panel (step S22). The operator operates the operation lever 130 (FIG. 2) while looking at the rotation angles θ1 to θ3 displayed on the display panel to bring the work attachment 4, in particular, the boom 15 close to the initial setting posture (step S23).

When the boom 15 is brought into the initial setting posture by the operation by the operator, the position information acquisition unit 125 (FIG. 2) acquires comparative position information of the boom 15 from distance image data acquired by the distance sensor 110 (step S24).

The displacement detection unit 121 compares the comparative position information including data (coordinates, distance data) of the closest position Ms with the initial position information including data (coordinates, distance data) of the closest position Mi, the initial position information being stored in the storage unit 124 (step S25). When the difference Δ between the comparative position information and the initial position information≤a (YES in step S26), the displacement detection unit 121 determines that there is no displacement in the distance sensor 110 fixed to the operator cab 31. In this case, the displacement detection unit 121 displays "OK display" on the display panel of the operator cab 31 (step S27).

On the other hand, when the difference Δ between the comparative position information and the initial position information>a (NO in step S26), the displacement detection unit 121 determines that there is a displacement in the distance sensor 110 fixed to the operator cab 31. In this case, the displacement detection unit 121 causes the notification unit 140 to notify waning information of the displacement (step S28). When the displacement check mode by the displacement detection unit 121 is finished, the operator corrects the displacement of the distance sensor 110. Thus, it is possible to stably detect and correct the displacement of the distance sensor 110.

(4) Further, the above embodiment describes the hybrid excavator as the construction machine according to the present invention. However, the present invention is not limited thereto. The construction machine according to the present invention may be a crane, a demolition machine, an excavator, or a handling machine. Further, the construction machine may not include vertically separated vehicle bodies including the lower traveling body 11 and the upper slewing body 12 as illustrated in FIG. 1, but may include a single vehicle body.

(5) Further, the above embodiment describes the distance sensor as the detection unit of the present invention. However, the present invention is not limited thereto. A camera may be disposed as the detection unit on the upper slewing body 3 (first structure). Photographed data captured by the camera includes environment data indicating information (distance distribution) of an environment around the upper slewing body 3. The position information acquisition unit 125 may acquire position information of a specific part of the boom 15 from the photographed data. Further, the camera may be a known distance image camera.

The invention claimed is:

1. A construction machine comprising:

a first structure;

a second structure relatively rotatable around a predetermined shaft relative to the first structure;

a detection unit that is disposed on the first structure, has a predetermined detection range, and detects environment data indicating information of an environment around the first structure;

a position information acquisition unit that acquires position information of a specific part of the second structure with respect to the detection unit from the environment data detected by the detection unit;

a storage unit capable of storing initial position information of the specific part, the initial position information being acquired from the environment data by the position information acquisition unit at initial setting when the second structure is disposed at an initial posture around the shaft, the initial posture being previously set so that the second structure is included in the detection range of the detection unit and outputting the initial position information; and a displacement detection unit that compares comparative position information of the specific part, the comparative position information being acquired from the environment data by the position information acquisition unit, with the initial position information output from the storage unit to detect a displacement of the detection unit in the first structure when the second structure is brought into the initial posture again after the initial setting.

2. The construction machine according to claim 1, wherein the position information acquisition unit acquires, as the position information, data of a closest position closest to the detection unit in the specific part of the second structure in the environment data.

3. The construction machine according to claim 1, further comprising a posture information acquisition unit that acquires posture information of the second structure with respect to the first structure, wherein the storage unit is further capable of storing initial posture information of the second structure, the initial posture information being acquired by the posture information acquisition unit at the initial setting, and outputting the initial posture information, the construction machine further includes a posture determination unit that compares the posture information acquired by the posture information acquisition unit after the initial setting with the initial posture information output from the storage unit to determine that the second structure is brought into the initial posture again, and the displacement detection unit detects a displacement of the detection unit when the posture determination unit determines that the second structure is brought into the initial posture again.

4. The construction machine according to claim 3, wherein the posture information acquisition unit includes an angle sensor that detects, as the posture information of the second structure, a rotation angle of the second structure around the shaft with respect to the first structure.

5. The construction machine according to claim 1, wherein the first structure is a vehicle body including an operator cab, the second structure includes a boom that is disposed adjacent to the operator cab and rotated around the shaft extending in a horizontal direction raisably and lowerably with respect to the vehicle body, and a holding attachment that is connected to a distal end side of the boom and capable of holding a predetermined held object, and the detection unit is disposed on the operator cab such that at least one of the boom and the holding attachment is included in the detection range.

6. The construction machine according to claim 5, wherein the detection unit is disposed on the operator cab such that the holding attachment is included in the detection range, and the construction machine further includes an interference prevention unit that detects an interfering object that is the holding attachment or the held object using the environment data detected by the detection unit and determines a risk of interference of the detected interfering object with the operator cab.

7. The construction machine according to claim 1, wherein the first structure is an upper slewing body slewing around the shaft extending in a vertical direction, and the second structure is a lower traveling body.

8. The construction machine according to claim 7, wherein the lower traveling body is included in the detection range of the detection unit in the initial posture by setting, as the initial posture, a posture in which the upper slewing body is slewed such that a side edge of the upper slewing body intersects a side edge of the lower traveling body in top view.

9. The construction machine according to claim 1, wherein the detection unit is a distance sensor that has a predetermined field of view as the detection range and detects distance image data indicating a distance distribution of an environment around the first structure as the environment data.

10. The construction machine according to claim 9, wherein the distance sensor includes a light source that applies infrared rays and a camera that receives reflected light of the infrared rays.

11. The construction machine according to claim 9, wherein the distance sensor includes a stereo camera.

* * * * *